United States Patent
Wei (10) Patent No.: US 10,530,513 B2
(45) Date of Patent: Jan. 7, 2020

(54) ASYNCHRONOUS DATA MULTIPLEXING METHOD AND DEVICE

(71) Applicant: Hangzhou YiYuQianXiang Technology Co., Ltd., Hangzhou (CN)

(72) Inventor: Pingting Wei, Hangzhou (CN)

(73) Assignee: HANGZHOU YIYUQIANXIANG TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 15/979,386

(22) Filed: May 14, 2018

(65) Prior Publication Data

US 2018/0331773 A1  Nov. 15, 2018

(30) Foreign Application Priority Data

May 12, 2017  (CN) .......................... 2017 1 0335743

(51) Int. Cl.
| | |
|---|---|
| *H04L 1/00* | (2006.01) |
| *H04J 3/08* | (2006.01) |
| *H04J 3/16* | (2006.01) |
| *H04J 3/24* | (2006.01) |

(52) U.S. Cl.
CPC .............. *H04J 3/08* (2013.01); *H04J 3/1688* (2013.01); *H04J 3/24* (2013.01); *H04L 1/0063* (2013.01); *H04L 1/0083* (2013.01); *H04L 1/009* (2013.01); *H04L 1/0061* (2013.01)

(58) Field of Classification Search
CPC ... H04J 3/08; H04L 1/00; H04L 1/009; H04L 1/0083; H04L 1/0063
See application file for complete search history.

(56) References Cited

U.S. PATENT DOCUMENTS

| | | | | |
|---|---|---|---|---|
| 2004/0153587 A1* | 8/2004 | Choi | ................... | G06F 13/4022 710/52 |
| 2005/0201164 A1* | 9/2005 | Barth | ...................... | G06F 13/16 365/189.05 |
| 2005/0271054 A1* | 12/2005 | Kang | ...................... | H04L 47/24 370/389 |
| 2006/0178918 A1* | 8/2006 | Mikurak | ................ | G06Q 10/06 705/7.25 |
| 2008/0101499 A1* | 5/2008 | Fung | ................... | H04L 27/2613 375/295 |
| 2009/0307392 A1* | 12/2009 | Mychalowych | .... | G06F 13/4045 710/51 |

(Continued)

*Primary Examiner* — Chi Ho A Lee
(74) *Attorney, Agent, or Firm* — Gokalp Bayramoglu (57) ABSTRACT

The present invention provides an asynchronous data multiplexing method and device. The method includes the following steps: acquiring status flag, serial number, and data information of each branch data; performing asynchronous data buffering processing on the data information of each branch data according to preset channel transmission bit-serial number to obtain buffered data of each branch; then determining each branch data according to the status flag, if the status flag is valid identification information, a flag bit corresponding to a frame header is set according to the valid identification information, and the buffered data of the current branch data is added to a corresponding position of the data part by bit; and if the status flag is invalid identification information, the flag bit corresponding to the frame header is kept unchanged.

4 Claims, 5 Drawing Sheets

(56) References Cited

U.S. PATENT DOCUMENTS

| | | | |
|---|---|---|---|
| 2010/0074386 A1* | 3/2010 | Sakamoto | H04J 3/076 375/371 |
| 2013/0060363 A1* | 3/2013 | Warren | G06F 13/385 700/94 |
| 2014/0136737 A1* | 5/2014 | Dreps | G06F 5/16 710/52 |

* cited by examiner

ASYNCHRONOUS DATA MULTIPLEXING METHOD AND DEVICE

CROSS-REFERENCE TO RELATED APPLICATIONS

This Non-provisional application claims priorities under 35 U.S.C. § 119(a) on Patent Application No(s). 201710335743.8 filed in People's Republic of China on May 12, 2017, the entire contents of which are hereby incorporated by reference.

BACKGROUND OF THE INVENTION

Field of the Invention

The present invention relates to a digital microwave communication technical field and, more particularly, to an asynchronous data multiplexing method and device.

Description of the Related Art

Digital microwave communication is a kind of wireless transmission mode using a microwave band to carry out digital transmission of information. A digital microwave communication system includes an indoor unit IDU and an outdoor unit ODU. The indoor unit IDU multiplexes a plurality of different types of service data into a data stream according to a certain format and then gives the data stream to the outdoor unit ODU for sending out. In other words, the data stream corresponding to a sending end is de-multiplexed at a receiving end through channel transmission, so as to achieve the two-way communication of multi-service. The data multiplexing mainly has three kinds: multiplexing by bit, multiplexing by word and multiplexing by frame, wherein multiplexing by word is to initially store a N-bit code word and multiplex multi-path service data by the way of polling. N is the bit-number of the minimal unit sent out through a channel at one time.

For multiplexing by word, in the process of multiplexing, data must be sent out through each branch, making a multiplexed data stream filled with invalid data and leading the multiplexed data stream to be too long, which not only results in the waste of bandwidth resources, but also reduces the speed of data processing and transmission.

BRIEF SUMMARY OF THE INVENTION

The objective of the present invention is to provide an asynchronous data multiplexing method for preventing invalid data from splicing into a data frame to reduce the multiplexing length and size of the data frame. Thus improving processing and transmission efficiency and saving the processing resources of the data multiplexing sending end(s) and receiving end(s) and the bandwidth resources of channel(s).

The present invention provides an asynchronous data multiplexing method, including the following steps:

acquiring status flag, serial number, and data information of each branch data; the status flag at least including valid identification information and invalid identification information;

performing asynchronous data buffering processing on the data information of each branch data according to preset channel transmission bit-serial number to obtain buffered data of each branch;

performing polling detection on each branch data according to the serial number, and selecting the status flag according to a detection result; then determining each branch data according to the status flag, and performing multiplexing processing on each branch data according to a determination result to generate a data frame, and the data frame including at least a frame header and a data part;

if the status flag is the valid identification information, a flag bit corresponding to the frame header is set according to the valid identification information, and the buffered data of current branch data is added to a corresponding position of the data part in a bitwise manner; and if the status flag is the invalid identification information, the flag bit corresponding to the frame header is kept unchanged.

As an implementing mode, performing the asynchronous data buffering processing on each branch data according to the preset channel transmission bit-serial number to obtain the buffered data of each branch may include the following steps:

performing formatting processing on each branch data according to the preset channel transmission bit-serial number, and wherein a bit-number of the generated buffered data may be an integral multiple of a bit-number of the channel transmission bit-serial number.

As an implementing mode, the asynchronous data multiplexing method of the present invention may further include the following steps:

before performing the polling detection on each branch data according to the serial number, calculating a total branch quantity value according to the serial number, and then determining whether the total branch quantity value is an integral multiple of the channel transmission bit-serial number according to the total branch quantity value and the channel transmission bit-serial number; and if the total branch quantity value is not the integral multiple of the channel transmission bit-serial number, on the basis that the sum of the total branch quantity value and M invalid identifiers is a minimal integral multiple of the channel transmission bit-serial number, adding the corresponding M invalid identifiers into the frame header, wherein M may be an integer.

As an implementing mode, the asynchronous data multiplexing method of the present invention may further include the following steps:

after performing the polling detection on each branch data according to the serial number, verifying the frame header and the data part, and setting a verification result to a frame end.

Correspondingly, the present invention further provides an asynchronous data multiplexing device, including an information acquisition module, a data processing module, a detection multiplexing processing module, a setting multiplexing module and a holding module;

the information acquisition module is configured to acquire status flag, serial number. and data information of each branch data; the status flag at least includes valid identification information and invalid identification information;

the data processing module is configured to perform asynchronous data buffering processing on the data information of each branch data according to preset channel transmission bit-serial number to obtain buffered data of each branch;

the detection multiplexing processing module is configured to perform polling detection on each branch data according to the serial number, and select the status flag according to a detection result; then determine each branch data according to the status flag, and perform multiplexing processing on each branch data according to a determination result to generate a data frame, and the data frame at least including a frame header and a data part;

if the status flag is the valid identification information, the setting multiplexing module is configured to set a flag bit corresponding to the frame header according to the valid identification information, and the buffered data of current branch data is added to a corresponding position of the data part in a bitwise manner; and if the status flag is the invalid identification information, the holding module holds the flag bit corresponding to the frame header unchanged.

As an implementing mode, the data processing module may include a buffered data generation unit;

the buffered data generation unit may be configured to perform formatting processing on each branch data according to the preset channel transmission bit-serial number, and a bit-number of the generated buffered data may be an integral multiple of a bit-number of the channel transmission bit-serial number.

As an implementing mode, the asynchronous data multiplexing device of the present invention may further include a calculation determining module and an adding module;

before performing the polling detection on each branch data according to the serial number, the calculation determining module may be configured to calculate a total branch quantity value according to the serial number, and then to determine whether the total branch quantity value is an integral multiple of the channel transmission bit-serial number according to the total branch quantity value and the channel transmission bit-serial number; and if the total branch quantity value is not the integral multiple of the channel transmission bit-serial number, on the basis that the sum of the total branch quantity value and M invalid identifiers is a minimal integral multiple of the channel transmission bit-serial number, the adding module may be configured to add the corresponding M invalid identifiers into the frame header, wherein M may be an integer.

As an implementing mode, the asynchronous data multiplexing device of the present invention may further include a verification module; and after performing the polling detection on each branch data according to the serial number, the verification module may be configured to verify the frame header and the data part and set a verification result to a frame end.

Compared with the prior art, the present technical solution has the following advantages:

The present invention provides an asynchronous data multiplexing method and device, the asynchronous data multiplexing on each branch data is performed by acquiring the status flag, ignoring the invalid data and only splicing the valid data into the data frame thus to reduce the multiplexing length and size of the data frame. Therefore improving the processing and transmission efficiency and saving the processing resources of the data multiplexing sending end(s) and the receiving end(s) and the bandwidth resources of the channel(s).

In the figures: 100 information acquisition module; 200 data processing module; 210 buffered data generation unit; 300 detection multiplexing processing module; 400 setting multiplexing module; 500 holding module; 600 verification module; 700 calculation determining module; and 800 adding module.

DETAILED DESCRIPTION OF THE INVENTION

Hereinafter, the above and other technical features and advantages of the present invention will be clearly and completely described in combination with the accompanying figures. The described embodiments are merely parts of the embodiments of the present invention instead of all the embodiments, and do not limit the disclosure.

Figure 1:
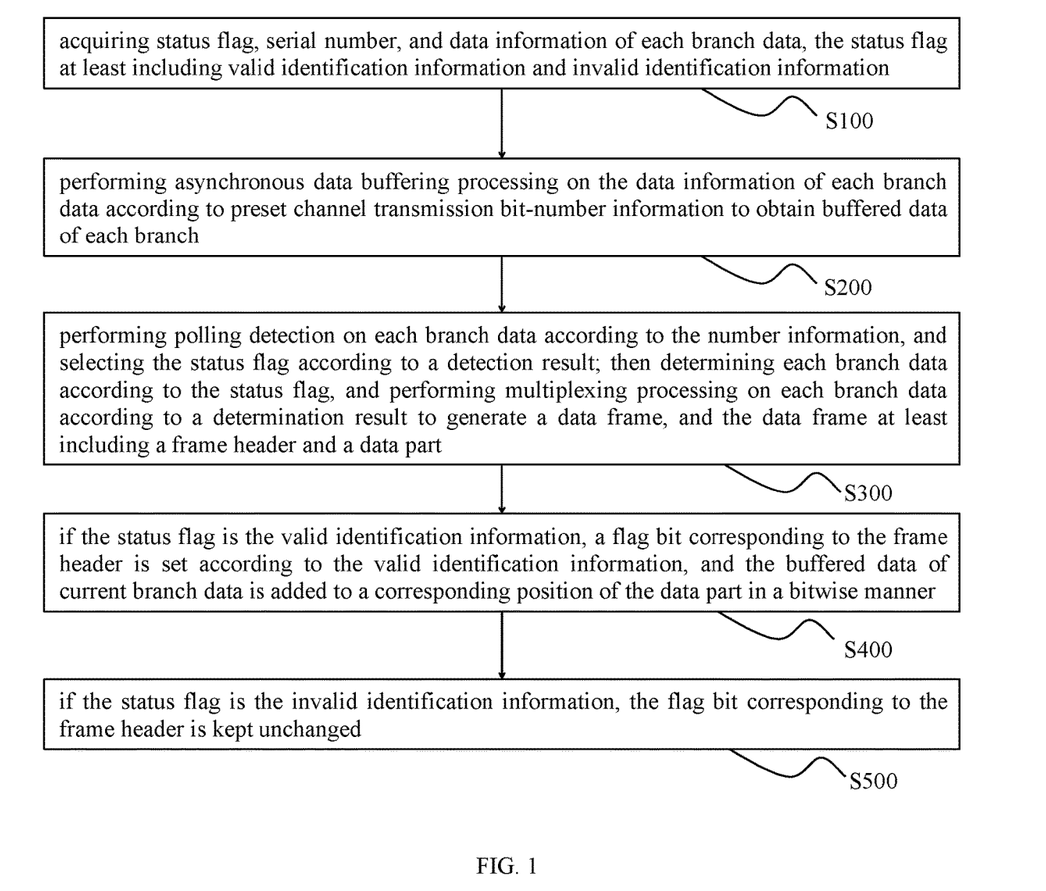
FIG. 1 is a structure schematic diagram of an asynchronous data multiplexing method provided in Embodiment one of the present invention.

Please refer to FIG. 1. Embodiment one of the present invention provides an asynchronous data multiplexing method, including the following steps:

S100, acquiring status flag, serial number, and data information of each branch data; the status flag at least including valid identification information and invalid identification information.

Each of the above branches has its own unique serial number, and the data information is the data that requires to be multiplexed and transmitted. However, it should be noted that the status flag is not always the same, and the status flag can be changed according to demands. When the data information of the current branch is needed, make the status flag to be the valid identification information; on the contrary, when the data information of the current branch is not needed, make the status flag to be the invalid identification information; and acquiring the status flag, the serial number and the data information of each branch data are carried out in real time, which is conductive to multiplexing the needed branch data according to the actual needs.

S200, asynchronous data buffering processing is performed on the data information of each branch data according to preset channel transmission bit-serial number to obtain buffered data of each branch; and the asynchronous data buffering processing is performed on the data information to improve multiplexing efficiency.

S300, polling detection is performed on each branch data according to the serial number, and the status flag is selected according to a detection result; then each branch data is determined according to the status flag, and multiplexing processing is performed on each branch data according to a determination result to generate a data frame, and the data frame at least includes a frame header and a data part.

Complete a round of polling detection on all the branch data, that is, to generate a data frame, and the frame header includes some the necessary control information, such as synchronization information, address information, error control information and so on; and the data part includes the data passed from the network layer, such as ip data packets.

S400, if the status flag is the valid identification information, a flag bit corresponding to the frame header is set according to the valid identification information, and the buffered data of the current branch data is added to a corresponding position of the data part in a bitwise manner (i.e. by bit).

S500, if the status flag is the invalid identification information, the flag bit corresponding to the frame header is kept unchanged.

The present invention provides an asynchronous data multiplexing method, performing the asynchronous data multiplexing on each branch data by acquiring the status flag, ignoring the invalid data and only splicing the valid data into the data frame to reduce the multiplexing length and size of the data frame, so as to improve the processing and transmission efficiency and save the processing resources of the data multiplexing sending end(s) and the receiving end(s) and the bandwidth resources of the channel(s).

For the above-mentioned steps, it needs to be explained that the flag bit of the frame header is in one-to-one correspondence with each branch data, regardless of whether the branch data is the valid identification information or the invalid identification information. That is, the corresponding flag bit in the frame header will be processed (set or kept unchanged) for each determination of the branch data. However, in the data part, not all the buffered data of each branch is multiplexed, and only when the status flag of the current branch is detected to be the valid identification information, the buffered data of the current branch data is added to the corresponding position of the data part in a bitwise manner (i.e. by bit). That is to say, the buffered data of the data part is all valid data, and the buffered data order of each branch data is in one-to-one correspondence with the order of the flag bits after being set in the frame header. The invalid data multiplexing is effectively excluded, and the multiplexed branch data of the data part is ensured to be the valid data, which reduces the size of the data frame, thereby increasing the transmission efficiency.

Further, the specific steps of the asynchronous data buffering processing on the data information are: performing formatting processing on each branch data according to the preset channel transmission bit-serial number, and a bit-number of the generated buffered data is an integral multiple of a bit-number of the channel transmission bit-serial number. It should be noted that the asynchronous data buffering processing on the data information of each branch data is a prerequisite for being able to be asynchronous-data-communication-transmitted for the data information. The data format adopted by the asynchronous communication transmission is composed of a group of variable "bit-number". The first bit is called a start bit, its width is 1 bit, at a low level; then transmit a data with 5-8 bits, with high level being "1", and low level being "0"; there can also be a parity verification bit; and the last is a stop bit, the width can be 1 bit, 1.5 bits or 2 bits, and there can be a free bit between two data bits. After performing the asynchronous data buffering processing on the data information of each branch data, the operation rate of multiplexing can also be increased.

Figure 2:
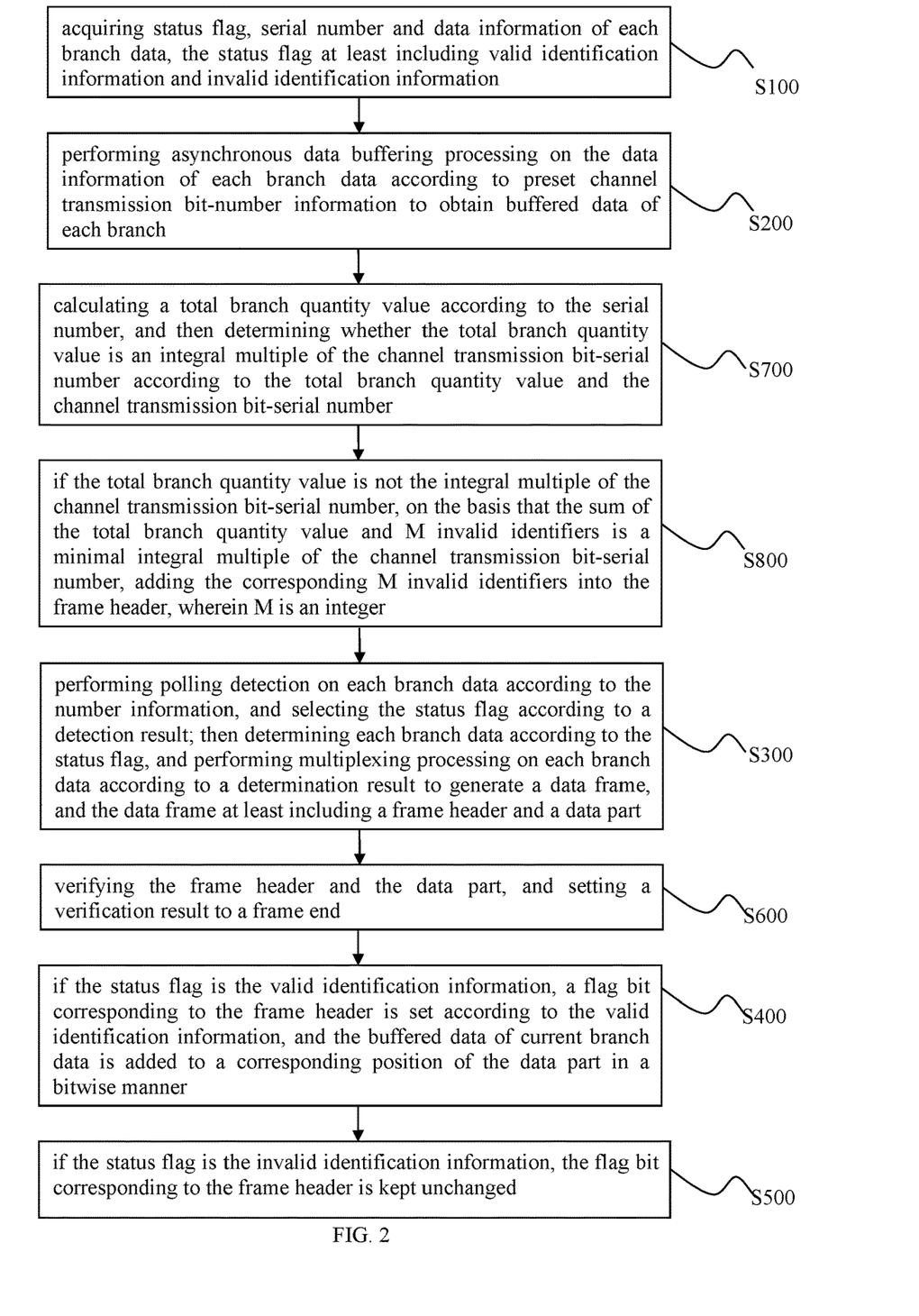
FIG. 2 is a structure schematic diagram of an asynchronous data multiplexing method provided in another embodiment of the present invention.

An asynchronous data multiplexing method provided by another embodiment of the present invention further includes the following steps based on the above embodiments:

S700, before performing the polling detection on each branch data according to the serial number, calculating a total branch quantity value according to the serial number, and then determining whether the total branch quantity value is an integral multiple of the channel transmission bit-serial number according to the total branch quantity value and the channel transmission bit-serial number; and S800, if the total branch quantity value is not the integral multiple of the channel transmission bit-serial number, on the basis that the sum of the total branch quantity value and M invalid identifiers is a minimal integral multiple of the channel transmission bit-serial number, adding the corresponding M invalid identifiers into the frame header, wherein M is an integer.

The structure of the data frame in the present embodiment is described in detail below.

Figure 3:
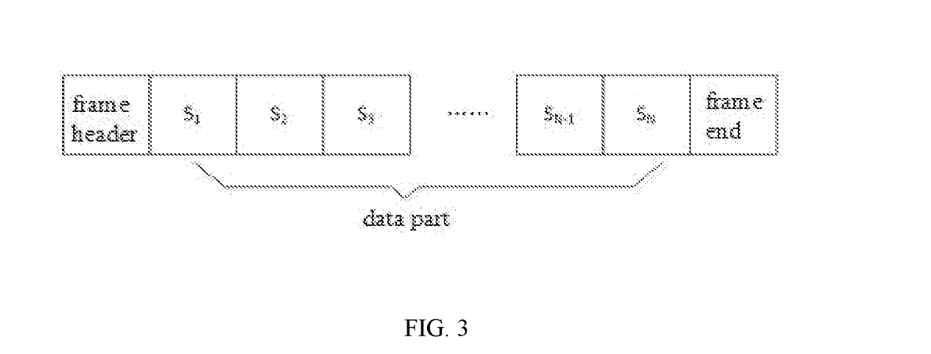
FIG. 3 is a structure schematic diagram of a data frame in FIG. 1.

As shown in FIG. 3, the figure is the structure schematic diagram of the data frame; the data frame includes a frame header, a data part and a frame end; and if the verification is not carried out and the field is not filled in the frame end, the frame end can be removed directly.

Figure 4:
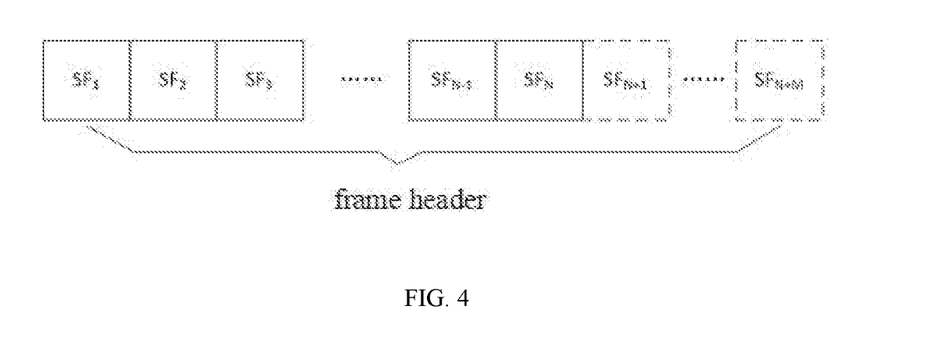
FIG. 4 is a structure schematic diagram of a frame header of the data frame in FIG. 3.

As shown in FIG. 4, the figure is the structure schematic diagram of the frame header of the data frame; the frame header includes a plurality of flag bits, and each flag bit uniquely corresponds to a piece of branch data. Further, the number of the flag bits of the frame header is an integral multiple of the preset channel transmission bit-serial number. If the total number of branches is less than the number of the flag bits, a corresponding number of invalid flag bits can be added to the flag bits of the frame header to make the numbers equal. For example, assuming that the given total branch quantity value is N and the bit-number of the minimal unit per channel sending which is the channel transmission bit-serial number is B, if the number of branches is less than the integral multiple of B, corresponding M invalid identifiers can be added into the frame header structure representing the total number of branches to make the numbers equal, such that a relation can be obtained: $N+M=n*B$, wherein n is an integer larger than 0.

The data part is formed by multiplexing the buffered data of the branch data. For example, assuming that the bit-number of the minimal unit per channel sending which is the channel transmission bit-serial number is B and the branch data has been formatted taking B as a unit, that is, the bit-number of the branch data is already the integral multiple of B, the branch data is multiplexed according to the order of the corresponding branch status bits in the frame header structure.

The asynchronous data multiplexing method provided by another embodiment of the present invention further includes the following steps based on the above embodiments:

S600, after performing the polling detection on each branch data according to the serial number, verifying the frame header and the data part, and setting a verification result to a frame end.

Figure 5:
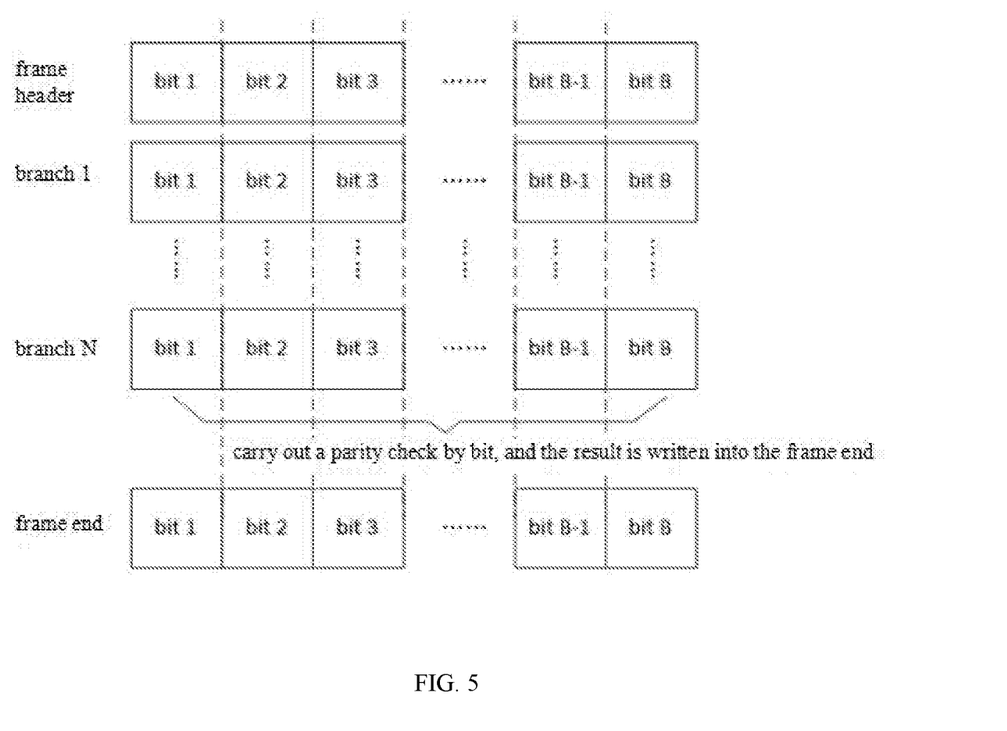
FIG. 5 is a schematic diagram of parity verification.

As shown in FIG. 5, the figure is a schematic diagram of a parity verification; in the present embodiment, the data frame further includes a frame end. There are many verification methods for the data frame, such as a parity verification, a CRC verification and so on. When the verification method adopts the parity verification, the verification value is stored in the frame end, and the length of the frame end is the bit-number of the minimal unit per channel sending to ensure the completeness of the data frame. For example, assuming that the bit-number of the minimal unit per channel sending which is the channel transmission bit-serial number is B, then the word length in the system is B, and the frame end is in one word length. The frame header and the data part of the frame are verified by an odd parity verification or an even parity verification by bit according to the word length, and the result is written into the frame end.

Based on the same inventive concept, the embodiment of the present invention further provides an asynchronous data multiplexing device. The implementation of the device can be achieved by referring to the process of the above method.

Figure 6:
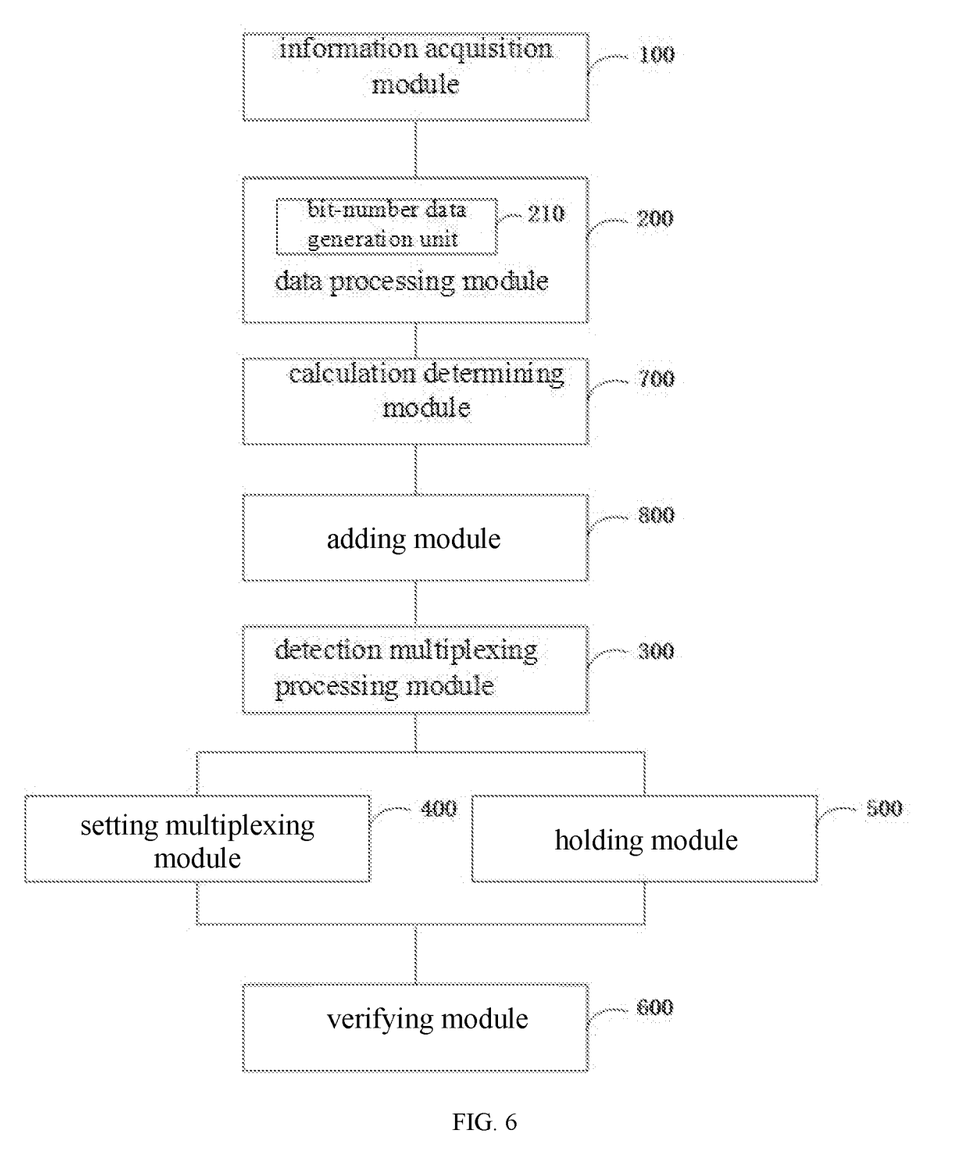
FIG. 6 is a structure schematic diagram of an asynchronous data multiplexing device provided in Embodiment two of the present invention.

As shown in FIG. 6, the asynchronous data multiplexing device provided by Embodiment two of the present invention includes an information acquisition module 100, a data processing module 200, a detection multiplexing processing module 300, a setting multiplexing module 400 and a holding module 500;

the information acquisition module 100 is configured to acquire status flag, serial number, and data information of each branch data; the status flag at least includes valid identification information and invalid identification information;

the data processing module 200 is configured to perform asynchronous data buffering processing on the data information of each branch data according to preset channel transmission bit-serial number to obtain buffered data of each branch;

the detection multiplexing processing module 300 is configured to perform polling detection on each branch data according to the serial number, and select the status flag according to a detection result; then determine each branch data according to the status flag, and perform multiplexing processing on each branch data according to a determination result to generate a data frame, and the data frame at least includes a frame header and a data part;

the setting multiplexing module 400 is configured to set a flag bit corresponding to the frame header according to the valid identification information, if the status flag is the valid identification information, and the buffered data of current branch data is added to a corresponding position of the data part in a bitwise manner; and the holding module 500 is configured to hold the flag bit corresponding to the frame header unchanged, if the status flag is the invalid identification information.

Further, the data processing module 200 includes a buffered data generation unit 210; the buffered data generation unit 210 is configured to perform formatting processing on each branch data according to the preset channel transmission bit-serial number, and a bit-number (i.e. the number of the bits) of the generated buffered data is an integral multiple of a bit-number (i.e. the number of the bits) of the channel transmission bit-serial number.

Further, the asynchronous data multiplexing device provided by another embodiment of the present invention further includes a calculation determining module 700 and an adding module 800 based on the above embodiments;

before performing the polling detection on each branch data according to the serial number, the calculation determining module 700 is configured to calculate a total branch quantity value according to the serial number, and then determine whether the total branch quantity value is an integral multiple of the channel transmission bit-serial number according to the total branch quantity value and the channel transmission bit-serial number; and if the total branch quantity value is not the integral multiple of the channel transmission bit-serial number, on the basis that the sum of the total branch quantity value and M invalid identifiers is a minimal integral multiple of the channel transmission bit-serial number, the adding module 800 is configured to add the corresponding M invalid identifiers into the frame header, wherein M is an integer.

Further, the asynchronous data multiplexing device provided by another embodiment of the present invention further includes a verification module 600 based on the above embodiments;

the verification module 600 is configured to verify the frame header and the data par and set a verification result to the frame end, after performing the polling detection on each branch data according to the serial number.

An asynchronous data multiplexing device provided by the present invention performs asynchronous data multiplexing on each branch data by acquiring the status flag, ignoring the invalid data and only splicing the valid data into the data frame to reduce the multiplexing length and size of the data frame. Thereby improving the processing and transmission efficiency and saving the processing resources of the data multiplexing sending end(s) and the receiving end(s) and the bandwidth resources of the channel(s).

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An asynchronous data multiplexing method, comprising the following steps:
   acquiring status flag, serial number, and data information of each branch data; the status flag at least comprising valid identification information and invalid identification information;
   performing asynchronous data buffering processing on the data information of each branch data according to preset channel transmission bit-serial number to obtain buffered data of each branch;
   performing polling detection on each branch data according to the serial number, and selecting the status flag according to a detection result; then determining each branch data according to the status flag, performing multiplexing processing on each branch data according to a determination result to generate a data frame, and the data frame at least comprising a frame header and a data part;
   wherein if the status flag is the valid identification information, a flag bit corresponding to the frame header is set according to the valid identification information, and the buffered data of current branch data is added to a corresponding position of the data part in a bitwise manner; and
   wherein if the status flag is the invalid identification information, the flag bit corresponding to the frame header is kept unchanged.

2. The asynchronous data multiplexing method according to claim 1, performing the asynchronous data buffering processing on each branch data according to the preset channel transmission bit-serial number to obtain the buffered data of each branch comprising the following steps:
   performing formatting processing on each branch data according to the preset channel transmission bit-serial number, and wherein a bit-number of the generated buffered data is an integral multiple of a bit-number of the channel transmission bit-serial number.

3. The asynchronous data multiplexing method according to claim 1, further comprising the following steps:
  before performing the polling detection on each branch data according to the serial number, calculating a total branch quantity value according to the serial number, and then determining whether the total branch quantity value is an integral multiple of the channel transmission bit-serial number according to the total branch quantity value and the channel transmission bit-serial number; and
  if the total branch quantity value is not the integral multiple of the channel transmission bit-serial number, on the basis that the sum of the total branch quantity value and M invalid identifiers is a minimal integral multiple of the channel transmission bit-serial number, adding the corresponding M invalid identifiers into the frame header, wherein M is an integer.

4. The asynchronous data multiplexing method according to claim 1, comprising the following steps:
  after performing the polling detection on each branch data according to the serial number, verifying the frame header and the data part, and setting a verification result to a frame end.

* * * * *